United States Patent
Ochi (10) Patent No.: US 11,958,469 B2
(45) Date of Patent: Apr. 16, 2024

(54) CONTROL DEVICE FOR VEHICLE

(71) Applicant: TOYOTA JIDOSHA KABUSHIKI KAISHA, Toyota (JP)

(72) Inventor: Yuta Ochi, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 205 days.

(21) Appl. No.: 17/651,102

(22) Filed: Feb. 15, 2022

(65) Prior Publication Data

US 2022/0281433 A1   Sep. 8, 2022

(30) Foreign Application Priority Data

Mar. 2, 2021 (JP) ................................. 2021-032949

(51) Int. Cl.
*B60W 20/13* (2016.01)
*B60K 6/485* (2007.10)
*F02P 5/15* (2006.01)
*B60K 6/387* (2007.10)

(52) U.S. Cl.
CPC ............. *B60W 20/13* (2016.01); *B60K 6/485* (2013.01); *F02P 5/151* (2013.01); *B60K 6/387* (2013.01); *B60W 2520/10* (2013.01); *B60W 2540/10* (2013.01); *B60W 2540/12* (2013.01); *B60W 2710/06* (2013.01); *B60Y 2200/92* (2013.01)

(58) Field of Classification Search
CPC ...... B60W 20/13; B60W 20/50; B60W 20/15; B60W 2710/024; B60W 2710/083; B60W 2710/085; B60K 6/485; B60K 6/387; F02P 5/151
See application file for complete search history.

(56) References Cited

U.S. PATENT DOCUMENTS

| 5,951,614 | A | * | 9/1999 | Tabata | ..................... B60L 50/16 903/945 |
| 11,518,386 | B2 | * | 12/2022 | Akiya | ..................... F02D 37/02 |
| 2012/0265382 | A1 | * | 10/2012 | Nefcy | ................. B60W 10/188 180/65.265 |

(Continued)

FOREIGN PATENT DOCUMENTS

| JP | 9-331602 A | 12/1997 |
| JP | 2006-159929 A | 6/2006 |
| JP | 2016-142390 A | 8/2016 |

(Continued)

*Primary Examiner* — George C Jin
(74) *Attorney, Agent, or Firm* — Oblon, McClelland, Maier & Neustadt, L.L.P.

(57) ABSTRACT

A control device for a vehicle including an internal combustion engine and an electric rotary machine connected to the internal combustion engine in a power-transmittable manner is able to perform torque-down through ignition delay control for delaying an ignition timing of the internal combustion engine and regeneration control for performing regeneration using the electric rotary machine when there is a torque-down request based on a vehicle state. The control device is configured to perform torque-down corresponding to a deficiency by delaying the ignition timing of the internal combustion engine when an actual torque of the electric rotary machine through the regeneration control is deficient for the torque-down request.

3 Claims, 9 Drawing Sheets

(56) References Cited

U.S. PATENT DOCUMENTS

| | | | |
|---|---|---|---|
| 2016/0069318 A1* | 3/2016 | Doering ................ | F02P 5/1504 |
| | | | 477/102 |
| 2020/0247388 A1* | 8/2020 | Johri ..................... | B60W 20/50 |

FOREIGN PATENT DOCUMENTS

| | | |
|---|---|---|
| JP | 2020-40536 A | 3/2020 |
| JP | 2020-104668 A | 7/2020 |

* cited by examiner

CONTROL DEVICE FOR VEHICLE

CROSS-REFERENCE TO RELATED APPLICATION

This application claims priority to Japanese Patent Application No. 2021-032949 filed on Mar. 2, 2021, incorporated herein by reference in its entirety.

BACKGROUND

1. Technical Field

The present disclosure relates to a control device for a vehicle.

2. Description of Related Art

Japanese Unexamined Patent Application Publication No. 2006-159929 (JP 2006-159929 A) discloses that a control device for a vehicle including an internal combustion engine and an electric rotary machine performs ignition delay control for delaying an ignition timing of the internal combustion engine and regeneration control for performing regeneration using the electric rotary machine and controls torque allocation for the ignition delay control and the regeneration control at the time of performing torque-down control. In the configuration described in JP 2006-159929 A, a torque-down amount is preferentially allocated to the internal combustion engine and the residual is allocated to the electric rotary machine at the time of performing torque-down control.

SUMMARY

Torque-down control includes, for example, high-responsiveness torque-down control for the purpose of damping control when an accelerator is switched from an OFF state to an ON state. In the high-responsiveness torque-down control, the internal combustion engine is controlled and torque-down is performed by delaying the ignition timing of the internal combustion engine. Since the control of the ignition timing has high responsiveness, it is possible to perform high-responsiveness control. However, the torque-down control based on a delay of ignition realizes torque-down by decreasing thermal efficiency of the internal combustion engine. Therefore, in order to improve fuel efficiency, using an electric rotary machine for high-responsiveness torque-down control is conceivable.

In the electric rotary machine, a response delay from a request for outputting a torque to actual outputting of a torque occurs. Accordingly, when regeneration using the electric rotary machine is performed in the high-responsiveness torque-down control, there is concern that control based on a required torque-down amount may not be performed and a shock may be generated due to cooperation with the internal combustion engine not being obtained.

The present disclosure provides a control device for a vehicle that can enhance fuel efficiency while curbing generation of a shock at the time of performing torque-down.

According to an aspect of the present disclosure, there is provided a control device for a vehicle including an internal combustion engine and an electric rotary machine connected to the internal combustion engine in a power-transmittable manner, the control device being able to perform torque-down through ignition delay control for delaying an ignition timing of the internal combustion engine and regeneration control for performing regeneration using the electric rotary machine when there is a torque-down request based on a vehicle state. The control device is configured to perform torque-down corresponding to a deficiency by delaying the ignition timing of the internal combustion engine when an actual torque of the electric rotary machine through the regeneration control is deficient for the torque-down request.

With this configuration, since the ignition timing is controlled based on an actual torque of the electric rotary machine at the time of torque-down, a response delay of the electric rotary machine is considered. Accordingly, it is possible to enhance fuel efficiency while curbing generation of a shock at the time of performing torque-down.

A guard value for slowly changing a regenerative torque output from the electric rotary machine through the regeneration control may be set in the regenerative torque, and the guard value may be a value varying according to a vehicle speed and be set such that a rate of change in regenerative torque per unit time increases as the vehicle speed increases.

With this configuration, since the slow-change guard value based on the vehicle speed is provided in the regenerative torque of the electric rotary machine, it is possible to prevent generation of a shock due to a response delay of the electric rotary machine at the time of performing torque-down.

The vehicle may further include an engagement unit that is provided in a power transmission path between the electric rotary machine and driving wheels, and the guard value may be a value varying according to an engagement state of the engagement unit and be set such that the rate of change in regenerative torque per unit time increases when the engagement unit is not in an engaged state.

With this configuration, since the slow-change guard value based on the engagement state of the engagement unit is provided in the regenerative torque of the electric rotary machine, it is possible to prevent generation of a shock due to a response delay of the electric rotary machine at the time of performing torque-down.

The vehicle may further include a torque converter that is provided between the internal combustion engine and an automatic transmission, the engagement unit may be a lockup clutch that is provided in the torque converter, and the guard value may be set such that the rate of change in regenerative torque per unit time increases when the lockup clutch is not in a directly connected state.

With this configuration, since the slow-change guard value based on the engagement state of the lockup clutch is provided in the regenerative torque of the electric rotary machine, it is possible to prevent generation of a shock due to a response delay of the electric rotary machine at the time of performing torque-down.

According to the present disclosure, since the ignition timing is controlled based on an actual torque of the electric rotary machine at the time of torque-down, a response delay of the electric rotary machine is considered. Accordingly, it is possible to enhance fuel efficiency while curbing generation of a shock at the time of performing torque-down.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, a control device for a vehicle according to an embodiment of the present disclosure will be described in detail with reference to the accompanying drawings. The applicable embodiment is not limited to the following embodiment.

Figure 1:
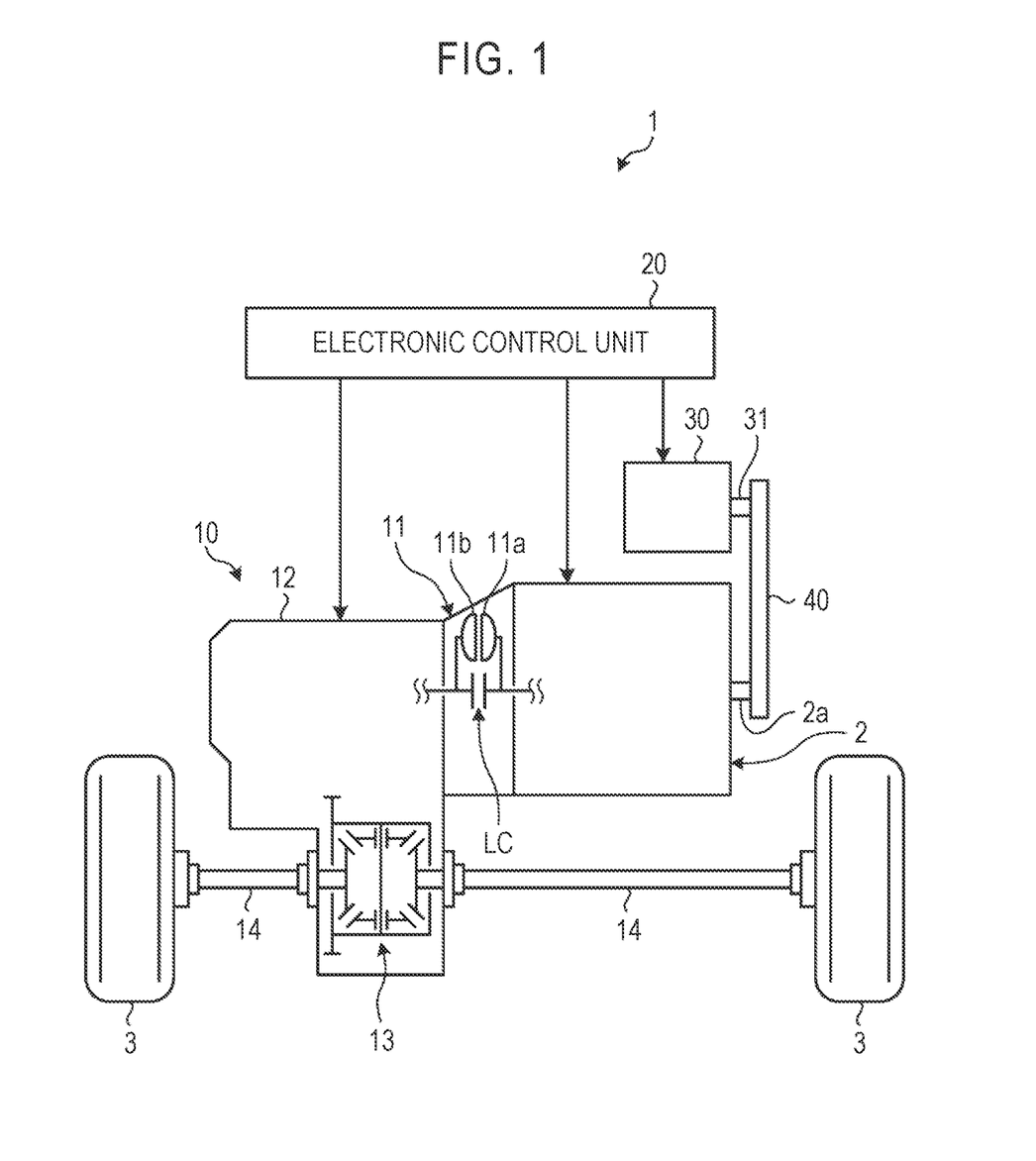
FIG. 1 is a diagram schematically illustrating a configuration of a vehicle according to an embodiment.

FIG. 1 is a diagram schematically illustrating a configuration of a vehicle according to an embodiment. The vehicle 1 includes an engine 2, driving wheels 3, and a power transmission device 10 that is provided on a power transmission path between the engine 2 and the driving wheels 3. The power transmission device 10 includes a torque converter 11, an automatic transmission 12, a differential gear 13, and a drive shaft 14. Power output from the engine 2 is transmitted to the driving wheels 3 sequentially via the torque converter 11, the automatic transmission 12, the differential gear 13, and the drive shaft 14.

The engine 2 is a power source for traveling and is a known internal combustion engine such as a gasoline engine or a diesel engine. An operation state such as a fuel injection timing or an ignition timing of the engine 2 is controlled by an electronic control unit 20. The detailed configuration of the electronic control unit 20 will be described later.

The torque converter 11 is a hydraulic power transmission device that is provided on a power transmission path between the engine 2 and the automatic transmission 12. The torque converter 11 includes a pump impeller 11a that is an input-side rotary member, a turbine runner 11b that is an output-side rotary member, and a lockup clutch LC that is a direct connection clutch for selectively connecting the pump impeller 11a and the turbine runner 11b. The pump impeller 11a is connected to a crank shaft 2a of the engine 2. The turbine runner 11b is connected to an input shaft of the automatic transmission 12. The lockup clutch LC is a frictional engagement unit and can be in an engaged state, a semi-engaged state, and a disengaged state. When the lockup clutch LC is in the engaged state, frictional engagement elements thereof are completely engaged and a directly connected state in which a front cover which is an input member on the engine 2 side and a turbine shaft which is an output member on the automatic transmission 12 side are directly connected is obtained. In the directly connected state, the pump impeller 11a and the turbine runner 11b rotate as a unified body.

The power transmission device 10 includes a mechanical oil pump that is connected to the pump impeller 11a of the torque converter 11. The mechanical oil pump is driven by the engine 2 and discharges a hydraulic oil which has been taken from an oil fan. The hydraulic oil discharged from the mechanical oil pump is used to perform gear shift control of the automatic transmission 12 or control for switching an operation state of the lockup clutch LC.

The automatic transmission 12 is a stepped automatic transmission that forms a part of the power transmission path between the engine 2 and the driving wheels 3. For example, the automatic transmission 12 is a planetary gear type multi-stage transmission in which a plurality of planetary gear units is arranged on the same axis. An output gear which is the output member of the automatic transmission 12 is connected to the differential gear 13 via a counter gear mechanism. In the vehicle 1, the automatic transmission 12, the counter gear mechanism, and the differential gear 13 are accommodated in a transaxle case attached to a vehicle body.

The automatic transmission 12 includes a plurality of engagement units including a clutch and a brake. The engagement units are hydraulic frictional engagement units, and operation states thereof are switched by changing a torque capacity according to hydraulic pressures which are engagement pressures output from a plurality of solenoid valves included in a hydraulic control circuit or the like. In the automatic transmission 12, rotary elements in a plurality of planetary gear units are engaged, disengaged, or selectively fixed by the engagement units. The automatic transmission 12 can selectively form a plurality of gear shift stages with different gear shift ratios by causing the electronic control unit 20 to selectively engage one of the engagement units according to an accelerator operation performed by a driver, a vehicle speed, or the like. For example, in the automatic transmission 12, gear stages (gear shift stages) of eight forward gear stages including a first gear stage to an eighth gear stage and a reverse gear stage are selectively formed.

The vehicle 1 includes a motor 30 which is a power source other than the engine 2. The motor 30 is a motor generator (MG) that can serve as both an electric motor and a power generator. The motor 30 is a known electric rotary machine. The motor 30 is electrically connected to a battery via an inverter. The battery is a secondary battery such as a lithium-ion battery. Electric power generated by the motor 30 can be stored in the battery. The motor 30 can be driven by supplying the electric power stored in the battery to the motor 30.

The motor 30 is connected to the engine 2 via a transmission belt 40 in a power-transmittable manner. The transmission belt 40 is suspended on a pair of pulleys including a first pulley provided in the crank shaft 2a of the engine 2 and a second pulley provided in an output shaft 31 of the motor 30. When the motor 30 serves as an electric motor, an output torque of the motor 30 (a motor torque) is input to the crank shaft 2a of the engine 2 via the transmission belt 40. Accordingly, the motor 30 can serve as a starter at the time of starting of the engine 2 and serve as a hybrid motor that assists with the engine 2 while the vehicle 1 is traveling. On the other hand, when the motor 30 serves as a power generator, for example, an output torque of the engine 2 (an engine torque) is input to the output shaft 31 of the motor 30 via the transmission belt 40. Accordingly, the motor 30 performs power generation (regeneration) with the rotation of the output shaft 31. That is, the motor 30 serves as an alternator. The motor 30 is not limited to power from the engine 2, but can perform regeneration in a state in which the output shaft 31 is rotating with an external force from driving wheels 3 when deceleration regeneration is performed while the vehicle 1 is traveling, or the like.

The vehicle 1 includes an electronic control unit 20 which is a controller that controls the vehicle 1. The electronic control unit 20 is an ECU including a microcomputer including, for example, a CPU, a RAM, a ROM, and an input/output interface. The electronic control unit 20 is a control device for the vehicle 1.

Signals from various sensors mounted in the vehicle 1 are input to the electronic control unit 20. Examples of the various sensors include a vehicle speed sensor that detects a vehicle speed, an engine rotation speed sensor that detects an engine rotation speed which is a rotation speed of the engine 2, an input rotation speed sensor that detects a rotation speed of the input shaft of the automatic transmission 12, an output rotation speed sensor that detects a rotation speed of an output gear of the automatic transmission 12, an accelerator operation amount sensor that detects an accelerator operation amount which is an amount of operation of an accelerator pedal, a throttle opening sensor that detects a throttle opening which is a degree of opening of an electronic throttle valve, an air flow sensor that detects an amount of intake air supplied to a cylinder of the engine 2, a brake stroke sensor that detects an amount of operation of a brake pedal, and a shift position sensor that detects an operation position of a shift lever.

The electronic control unit 20 controls the vehicle 1 by performing operation control of the engine 2, gear shift control of the automatic transmission 12, operation control of the motor 30, or the like based on input signals from various sensors. Command signals for devices to be controlled which are mounted in the vehicle 1 are output from the electronic control unit 20. For example, the electronic control unit 20 starts the engine 2 by outputting a command signal to the motor 30 and cranking the engine 2 using the motor 30 at the time of starting of the engine.

When drive control of the engine 2 is performed, a command signal for controlling an ignition timing of the engine 2 is output from the electronic control unit 20 to the engine 2. A throttle opening, an amount of injected fuel, an ignition timing, and the like of the engine 2 are electrically controlled by the electronic control unit 20. The electronic control unit 20 calculates a required drive force (a required torque) based on the accelerator operation amount and the vehicle speed and sets a target engine torque with which the required drive force is acquired. The electronic control unit 20 controls opening/closing of the electronic throttle valve using a throttle actuator such that the target engine torque is acquired, controls an amount of fuel injected from the fuel injection device, and controls an ignition timing of an ignition device.

When regeneration control of the motor 30 is performed, a command signal for controlling a regenerative torque is output from the electronic control unit 20 to the motor 30. The motor 30 can perform regeneration by outputting a negative torque (a torque acting in a negative direction) in a state in which the output shaft 31 thereof is rotating in a positive direction. For example, when depression of an accelerator pedal is released while the vehicle 1 is traveling, deceleration regeneration control for deceleration of the vehicle 1 is performed and regeneration using the motor 30 is performed. Alternatively, regeneration may be performed using the motor 30 with a torque which is transmitted from the engine 2 to the motor 30 in a state in which the engine 2 is operating.

The electronic control unit 20 performs torque-down control for decreasing a torque such that it is less than a torque which is required according to an accelerator operation amount. In this case, the electronic control unit 20 determines whether there is a request for decreasing the torque with respect to the required torque according to the accelerator operation amount (a torque-down request). When it is determined that there is a torque-down request, the electronic control unit 20 performs the torque-down control. When the torque-down control is performed, an input torque of the automatic transmission 12 becomes less than a torque based on an accelerator-operation-amount request.

The torque-down control includes ignition delay control for delaying the ignition timing of the engine 2 and regeneration control for performing regeneration using the motor 30. That is, the electronic control unit 20 performs the ignition delay control and the regeneration control as the torque-down control. Accordingly, when the torque-down control is performed, the electronic control unit 20 outputs a command signal for controlling the ignition timing to the engine 2 and outputs a command signal for controlling a motor torque (a regenerative torque) to the motor 30.

When there is a torque-down request, the electronic control unit 20 requests a torque corresponding to the torque-down request from regeneration using the motor 30. At this time, the electronic control unit 20 calculates an actual torque in consideration of a response delay of the motor 30. The electronic control unit 20 compares the actual torque of the motor 30 at the time of regeneration control and the torque corresponding to the torque-down request and determines whether the actual torque satisfies the request. When the actual torque of the motor 30 does not satisfy the request, that is, when the actual torque of the motor 30 is deficient for the torque corresponding to the torque-down request, the electronic control unit 20 performs torque-down of the deficiency by delaying the ignition timing of the engine 2. That is, the torque-down of the deficiency is realized by the ignition delay control. In this way, since the actual torque of the motor 30 includes a response delay, the electronic control unit 20 can achieve cooperation of the engine 2 and the motor 30 at the time of torque-down by controlling the ignition timing of the engine 2 while monitoring the actual torque of the motor 30.

Figure 2:
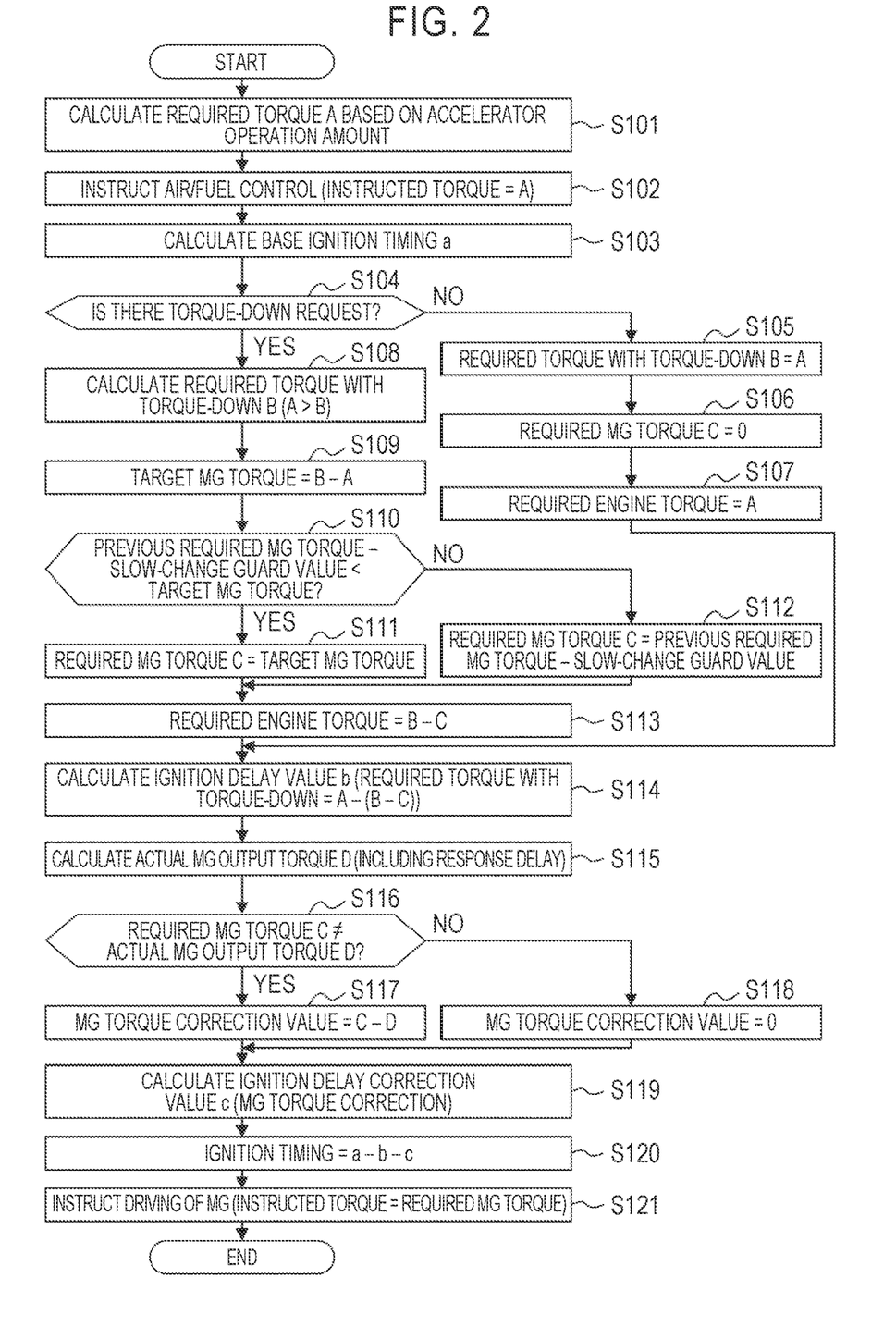
FIG. 2 is a flowchart illustrating a torque-down control flow.

FIG. 2 is a flowchart illustrating a torque-down control flow. The control flow illustrated in FIG. 2 is performed by the electronic control unit 20.

The electronic control unit 20 calculates a required torque A according to an accelerator operation amount (Step S101). In Step S101, the required torque A is calculated based on the accelerator operation amount and the vehicle speed. In the following description, the "required torque according to the accelerator operation amount" may be referred to as an "accelerator-operation-amount required torque," an "accelerator-operation-amount request," or simply a "required torque."

The electronic control unit 20 outputs an instruction for controlling a ratio of an amount of air and an amount of fuel which are supplied to a cylinder of the engine 2 (Step S102). In Step S102, the ratio of the amount of air and the amount of fuel, that is, an air-fuel ratio of an air-fuel mixture, is controlled such that the engine torque reaches an instructed torque. In Step S102, the required torque A calculated in Step S101 is set as the instructed torque. Then, the electronic control unit 20 outputs a command signal for controlling an amount of intake air and a command signal for controlling an amount of injected fuel to the engine 2 such that the engine torque reaches the instructed torque (=required torque A) and thus controls the amount of intake air and the amount of injected fuel.

The electronic control unit 20 calculates a base ignition timing a (Step S103). In Step S103, the base ignition timing a is calculated based on an engine rotation speed and an engine load factor. The electronic control unit 20 sets the base ignition timing a based on the engine rotation speed and the engine load factor, for example, using an ignition timing map stored in a memory.

Then, the electronic control unit 20 determines whether there is a torque-down request (Step S104). In Step S104, it is determined whether there is a torque-down request for the required torque A calculated in Step S101. The required torque A is a request based on a driver's operation of an accelerator. On the other hand, the torque-down request is a request according to a vehicle state. Various requests are input to the electronic control unit 20 according to a state of the vehicle 1.

For example, in Step S104, the electronic control unit 20 determines that there is a torque-down request at the time of so-called chip-in (when the torque of the engine 2 or the motor 30 has increased rapidly). Chip-in represents a case in which a torque of a power source has been rapidly increased by a driver's operation of an accelerator and includes a case in which the accelerator is switched from an OFF state to an ON state. Accordingly, when an accelerator operation speed becomes higher than a predetermined speed in the OFF state, the electronic control unit 20 can determine that there is a torque-down request. At the time of chip-in, since gear rattling of a gear in the power transmission device 10 occurs, torque-down control is performed as damping control for reducing noise sound or vibration due to gear rattling.

When there is no torque-down request (Step S104: NO), the electronic control unit 20 considers the required torque A as a required torque with torque-down B (Step S105), sets the required torque (the required MG torque) C of the motor 30 to zero (Step S106), and sets the required torque of the engine 2 (the required engine torque) to the required torque A (Step S107). When there is no torque-down request, regeneration using the motor 30 is not performed and thus the required MG torque C is set to zero in Step S106. Then, in order to satisfy the required torque A with the engine 2, the electronic control unit 20 sets the required torque A as the required engine torque. When the process of Step S107 is performed, the control routine proceeds to Step S114.

When there is a torque-down request (Step S104: YES), the electronic control unit 20 calculates the required torque with torque-down B (Step S108). In Step S108, the required torque with torque-down B is set to a value less than the required torque A.

The electronic control unit 20 calculates a target torque (a target MG torque) of the motor 30 (Step S109). In Step S109, the target MG torque (=B-A) is calculated by subtracting the required torque A from the required torque with torque-down B. The target MG torque is a target value of a regenerative torque when regeneration using the motor 30 is performed in response to the torque-down request. Since the required torque A is greater than the required torque with torque-down B, the target MG torque calculated by "B-A" has a negative value (a negative torque).

Figure 3:
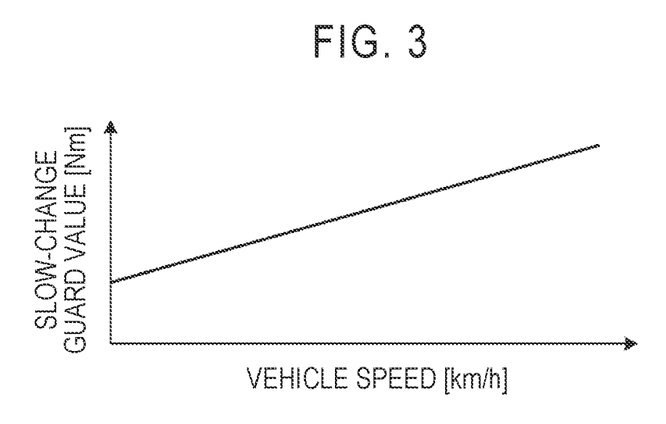
FIG. 3 is a diagram illustrating a relationship between a slow-change guard value and a vehicle speed.

Then, the electronic control unit 20 determines whether a value obtained by subtracting a slow-change guard value from a previous required MG torque is less than the target MG torque (Step S110). The previous required MG torque is a required MG torque which has been set in the previous control routine. The previous required MG torque is stored in the memory. The slow-change guard value is a guard value which is determined to slowly change a torque output from the motor 30 and is positive value. The slow-change guard value is, for example, a value which varies according to a vehicle speed as illustrated in FIG. 3 and is set such that a rate of change in regenerative torque per unit time increases as the vehicle speed increases. In Step S110, the electronic control unit 20 determines the slow-change guard value based on the vehicle speed and performs subtraction from the previous required MG torque using the determined slow-change guard value.

When the value obtained by subtracting the slow-change guard value from the previous required MG torque is less than the target MG torque (Step S110: YES), the electronic control unit 20 sets the target MG torque as the required MG torque C (Step S111). The target MG torque is calculated in Step S109.

When the value obtained by subtracting the slow-change guard value from the previous required MG torque is not less than the target MG torque (Step S110: NO), the electronic control unit 20 sets the value obtained by subtracting the slow-change guard value from the previous required MG torque as the required MG torque C (Step S112).

When the required MG torque C is set, the electronic control unit 20 calculates a required engine torque which is a torque required for the engine 2 (Step S113). In Step S113, the required engine torque (=B−C) is calculated by subtracting the required MG torque C from the required torque with torque-down B. The electronic control unit 20 sets the value obtained by subtracting the required MG torque C from the required torque with torque-down B as the required engine torque.

When the required engine torque is set, the electronic control unit 20 calculates an ignition delay value b by which the ignition timing of the engine 2 is delayed (Step S114). In Step S114, the ignition delay value b is calculated based on a required torque for torque-down. The required torque for torque-down is calculated by a relational expression "A−(B−C)."

For example, when step S114 is performed after Step S107, "A−(A−0)" is obtained by substituting the required torque with torque-down B set to "A" in Step S105 and the required MG torque C set to "0" in Step S106 for the relational expression (A−(B−C)" and thus the required torque for torque-down is zero. In this case, since torque-down in the engine 2 is not necessary, the ignition delay value b is set to zero.

Then, the electronic control unit 20 calculates a torque D which is actually output from the motor 30 (an actual output torque) (Step S115). In Step S115, the actual output torque D (<0) including a response delay of the motor 30 is calculated. The response delay is defined as a delay after a command signal is output from the electronic control unit 20 to the motor 30 and until a torque is actually output from the motor 30. In this description, the "actual output torque" may be referred to as an "actual MG output torque" or an "actual torque."

The electronic control unit 20 determines whether the required MG torque C is equal to the actual MG output torque D (Step S116).

When the required MG torque C is not the same as the actual MG output torque D (Step S116: YES), the electronic control unit 20 sets a value obtained by subtracting the actual MG output torque D from the required MG torque C as an MG torque correction value (Step S117). In Step S117, the MG torque is corrected and a correction value thereof is set to "C-D."

When the required MG torque C is the same as the actual MG output torque D (Step S116: NO), the electronic control unit 20 sets the MG torque correction value to zero (Step S118). In Step S118, since the MG torque is not corrected, the correction value is set to "0."

When the MG torque correction value is set, the electronic control unit 20 calculates an ignition delay correction value c based on the MG torque correction value (Step S119). In Step S119, the ignition delay correction value is determined depending on whether the MG torque is corrected. For example, in Step S119 subsequent to Step S117, since the MG torque correction value is "C-D," the ignition delay correction value c is set such that the correction value is satisfied. On the other hand, in Step S119 subsequent to Step S118, since the MG torque correction value is "0," the ignition delay correction value c is set to zero.

The electronic control unit 20 determines the ignition timing of the engine 2 based on the base ignition timing a, the ignition delay value b, and the ignition delay correction value c (Step S120). In Step S120, the electronic control unit 20 calculates the ignition timing by subtracting the ignition delay value b and the ignition delay correction value c from the base ignition timing a. Then, the electronic control unit 20 outputs a command signal for controlling the ignition timing such that the calculated ignition timing is achieved to the engine 2 and controls the ignition timing.

The electronic control unit 20 instructs the motor 30 to operate (Step S121). In Step S121, the required MG torque C is set as the instructed torque for the motor 30. The electronic control unit 20 outputs a command signal for controlling a regenerative torque such that the required MG torque C is achieved to the motor 30 and controls the regenerative torque. After the process of Step S121 is performed, the control routine ends.

The vehicle states when torque-down control is performed will be described below with reference to FIGS. 4 to 9.

Figure 4:
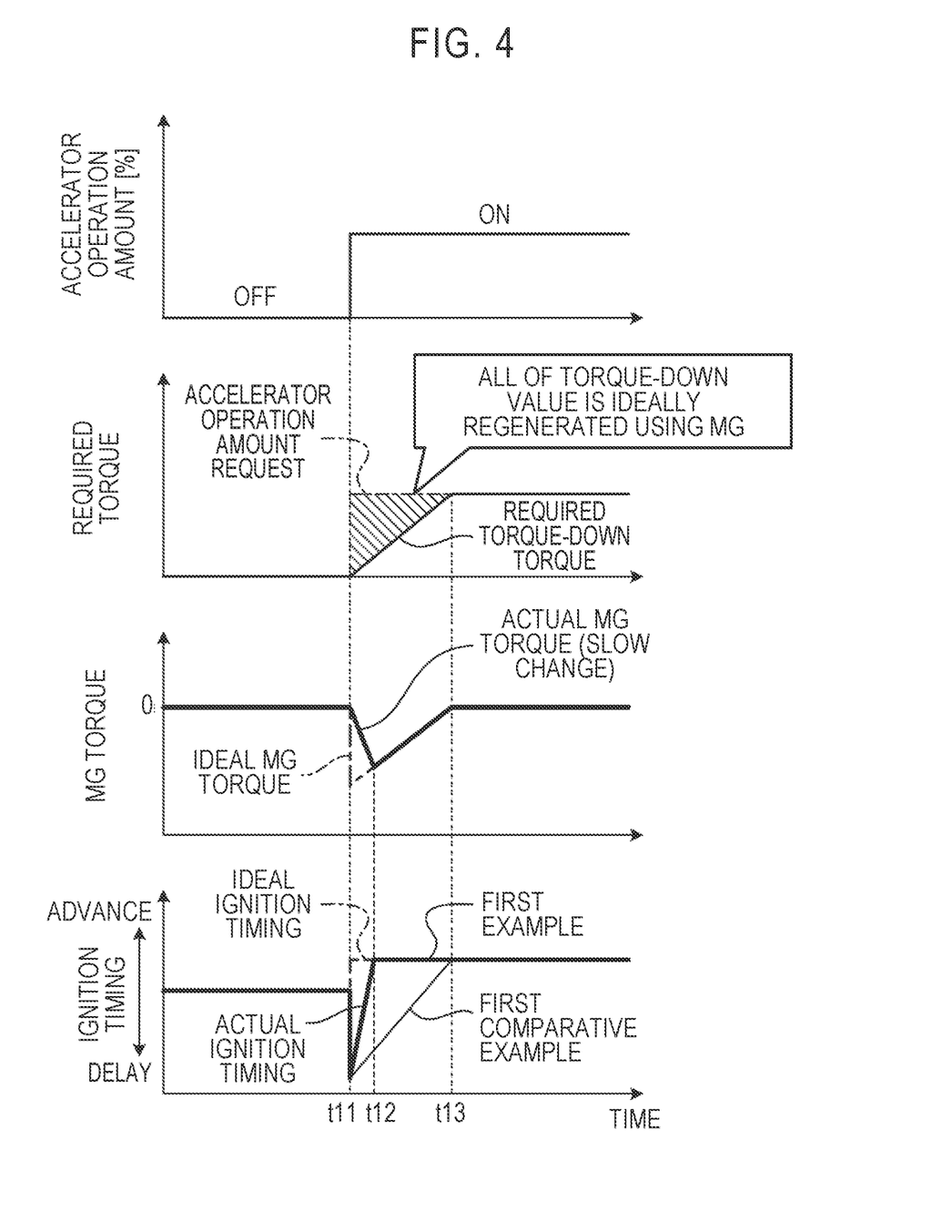
FIG. 4 is a timing chart illustrating a change of a vehicle state when torque-down control is performed according to a first example.
Figure 5:
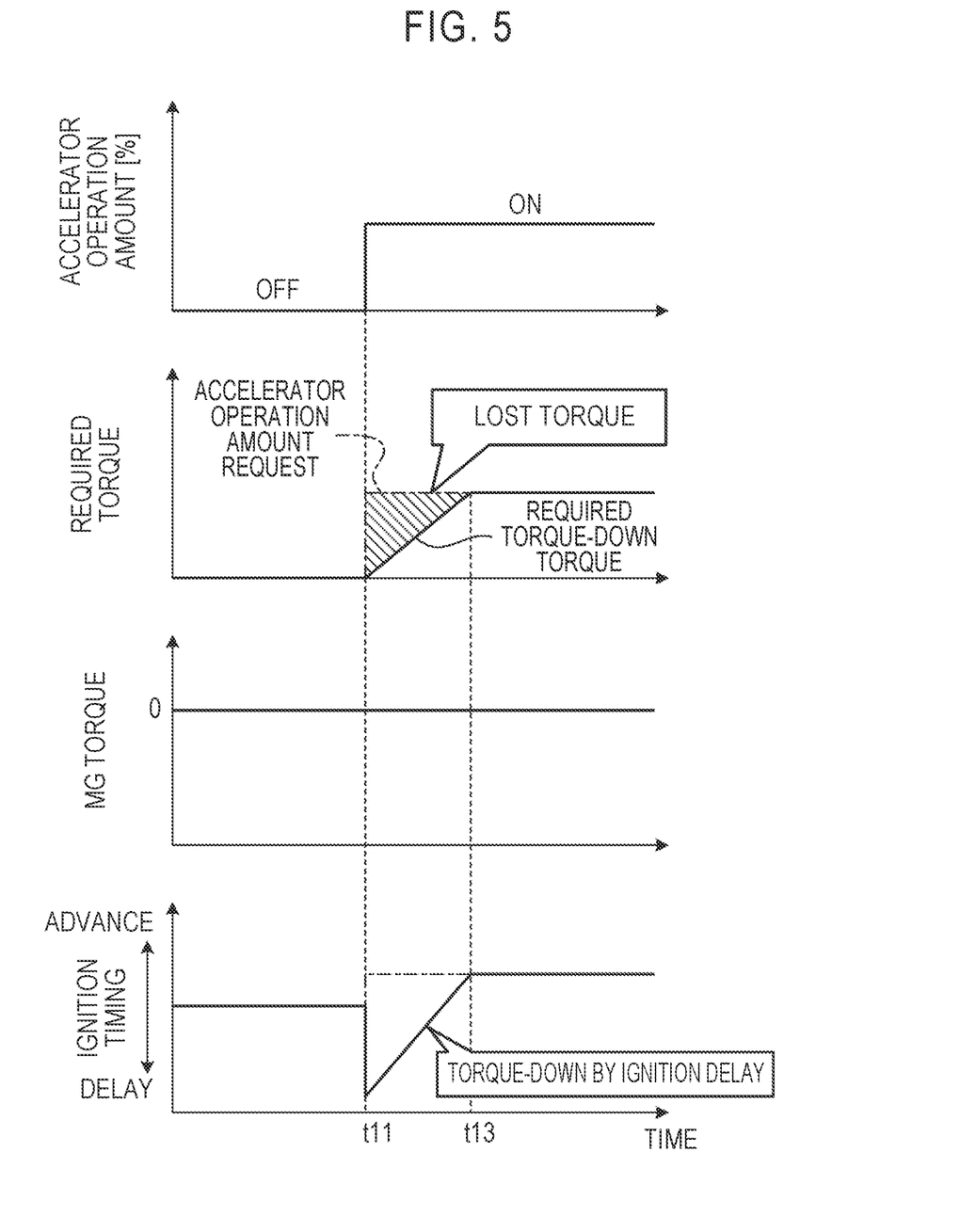
FIG. 5 is a timing chart illustrating a change of a vehicle state when torque-down control is performed according to a first comparative example.

First, a first example will be described. FIG. 4 is a timing chart illustrating a change of the vehicle state when torque-down control is performed according to the first example. FIG. 5 is a timing chart illustrating a change of the vehicle state when torque-down control is performed according to a first comparative example. The example will be described below with reference to the comparative example.

The first example is an example in which torque-down control is performed as damping control (chip-in damping control) when the accelerator is switched from the OFF state to the ON state and regeneration control of the motor 30 is performed. The first comparative example is an example in which regeneration control is not performed at the time of performing torque-down control and torque-down is performed using only the ignition delay. Since regeneration using the motor is not performed in the first comparative example, the torque corresponding to a difference between the accelerator-operation-amount request and the required torque for torque-down is lost as illustrated in FIG. 5. On the other hand, since regeneration using the motor 30 is performed in the first example, a torque corresponding to torque-down can be regenerated using the motor 30 as illustrated in FIG. 4.

As illustrated in FIG. 4, the accelerator operation amount increases rapidly by a driver's operation of depressing an accelerator pedal from a state in which depression of the accelerator pedal is released (time t11). At time t11, the electronic control unit 20 determines that there is a torque-down request and starts torque-down control. After time t11, the required torque is controlled such that it reaches the required torque with torque-down. When torque-down control is started, regeneration control using the motor 30 is started.

Immediately after the torque-down control is started (immediately after time t11), the torque output from the motor 30 changes slowly through slow change control. Ideally, it is considered that the torque is rapidly changed like an ideal MG torque indicated by a one dot chain line in FIG. 4 and all the torque corresponding to torque-down is regenerated using the motor 30 but, realistically, the motor torque needs to be slowly changed like an actual MG torque indicated by a solid line in FIG. 5 in consideration of responsiveness of the motor 30 or cooperation with the engine 2. Accordingly, the electronic control unit 20 performs slow change control of the regenerative torque immediately after time t11. In the slow change control, the actual MG torque is deficient for the ideal MG torque and the actual torque of the motor 30 is deficient for the torque-down request. In order to perform torque-down corresponding to the deficiency, the electronic control unit 20 starts ignition delay control for delaying the ignition timing immediately after time W. By controlling the ignition timing which is highly responsive at the initial time of torque-down, torque-down corresponding to a torque by which is not decreased by the motor 30 is achieved through the ignition delay control. Accordingly, immediately after time t11, the ignition timing based on the accelerator-operation-amount request is the same as the ideal ignition timing indicated by the one dot chain line in FIG. 4, but the ignition timing based on the torque-down request is controlled such that it is delayed with respect to the ideal ignition timing like the actual ignition timing indicated by the solid line in FIG. 4.

Then, the actual MG torque reaches the ideal MG torque (time t12). At time t12, the electronic control unit 20 ends the slow change control of the regenerative torque. In this case, the regeneration control is continuously performed in a state in which the actual torque of the motor 30 matches the ideal MG torque (the required MG torque). That is, after time t12, the torque corresponding to the torque-down request can be satisfied using only the regeneration using the motor 30. Accordingly, at time t12, the electronic control unit 20 ends the ignition delay control. In the period from time t11 to time t12, the ignition timing changes slowly such that it becomes an ignition timing based on the accelerator-operation-amount request.

Thereafter, the required torque for torque-down reaches the accelerator-operation-amount request (time t13). At time t13, the electronic control unit 20 ends the torque-down control.

In this way, in the first example, regeneration control is performed from time t11 to time t13 and ignition delay control is performed from time t11 to time t12. On the other hand, in the first comparative example, regeneration control is not performed and ignition delay control is performed from time t11 to time t13. According to the first example, it is possible to regenerate energy using the motor 30 through the regeneration control and it is possible to curb a decrease in fuel efficiency due to a delay of ignition because the period in which the ignition delay control is performed is shorter than that in the first comparative example. Accordingly, it is possible to increase regenerative energy without injection of additional fuel.

Figure 6:
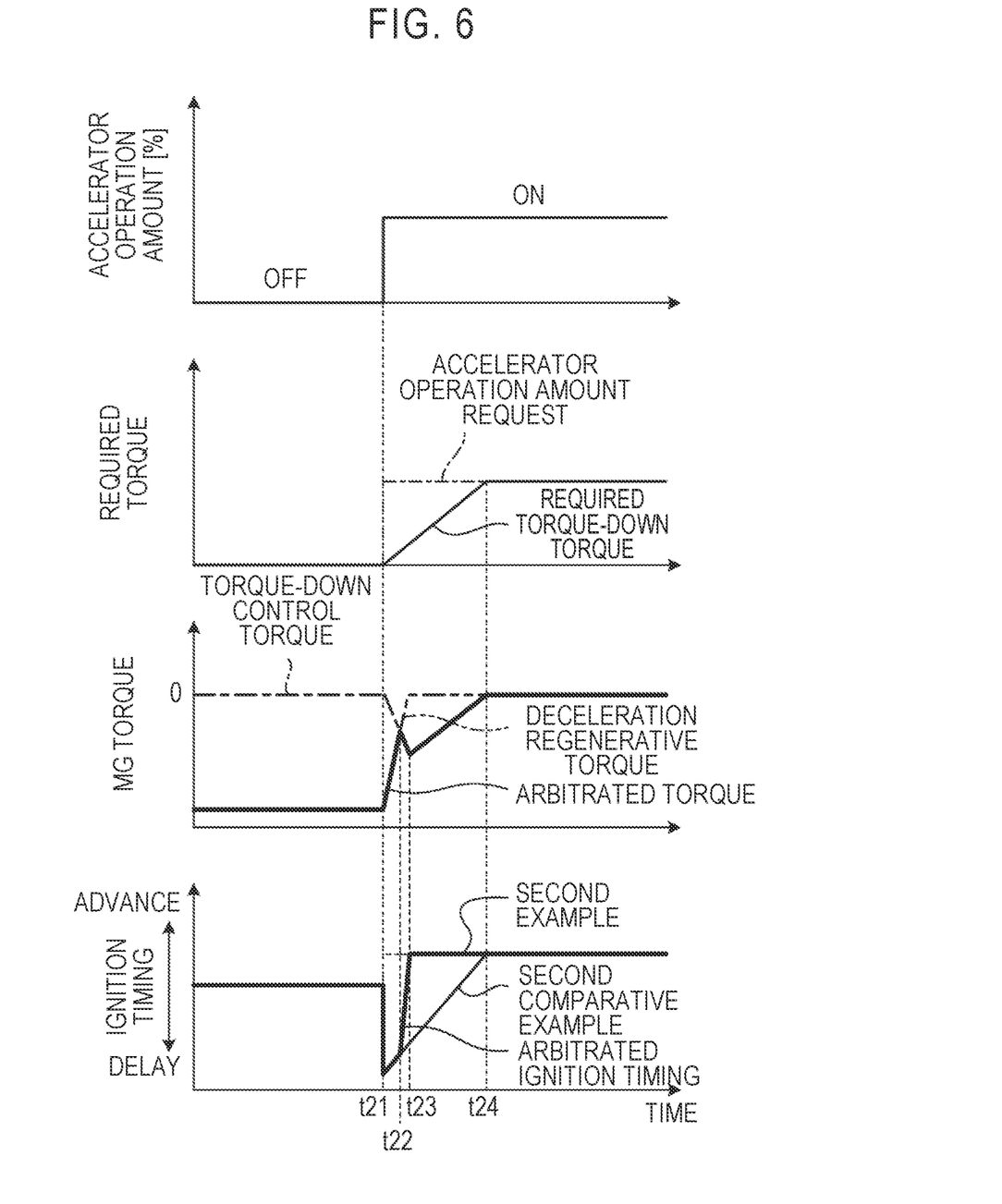
FIG. 6 is a timing chart illustrating a change of a vehicle state when torque-down control is performed according to a second example.
Figure 7:
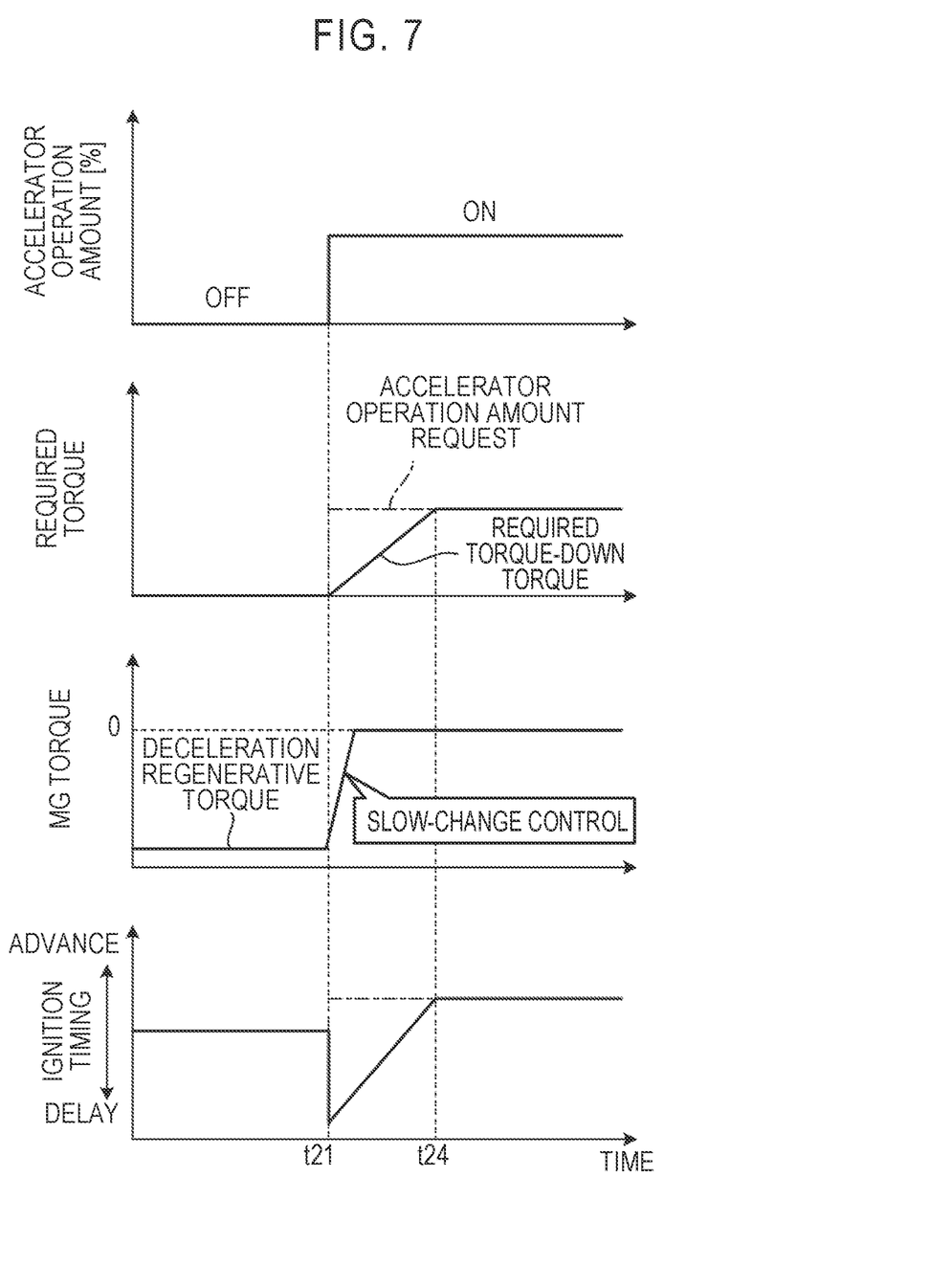
FIG. 7 is a timing chart illustrating a change of a vehicle state when torque-down control is performed according to a second comparative example.

A second example will be described below. FIG. 6 is a timing chart illustrating a change of the vehicle state when torque-down control is performed according to the second example. FIG. 7 is a timing chart illustrating a change of the vehicle state when torque-down control is performed according to a second comparative example.

The second example is an example in which torque-down control is performed as damping control when the accelerator is switched from the OFF state to the ON state in a state in which deceleration regeneration is being performed during travel. The second comparative example is an example in which regeneration control is performed during travel but regeneration control for torque-down is not performed at the time of performing torque-down control and torque-down is performed only through ignition delay control. In the second comparative example, when a deceleration regeneration state is switched to the ON state of the accelerator (time t21) as illustrated in FIG. 7, a deceleration regenerative torque changes slowly to zero to end the regeneration (after time t21). Since a shock is generated when regeneration is suddenly stopped, slow change control of the deceleration regenerative torque is performed to curb the shock. In this way, in the second comparative example, deceleration regeneration is performed in the OFF state of the accelerator, but regeneration for torque-down is not performed at the time of torque-down. On the other hand, in the second example, since regeneration for torque-down is performed, a torque corresponding to torque-down can be regenerated using the motor 30 as illustrated in FIG. 6.

As illustrated in FIG. 6, before time t21, depression of the accelerator pedal is released while the vehicle 1 is traveling and thus deceleration regeneration using the motor 30 is performed. Thereafter, when the accelerator operation amount increases rapidly by a driver's operation of depressing the accelerator pedal, the electronic control unit 20 determines that there is a torque-down request and starts torque-down control (time t21). When there is a torque-down request while deceleration regeneration is being performed, the electronic control unit 20 arbitrates between a deceleration regenerative torque and a torque-down control torque. That is, the electronic control unit 20 performs control such that the actual torque of the motor 30 reaches the arbitrated torque. The arbitrated torque is the smaller torque of the deceleration regenerative torque and the torque-down control torque.

In the example illustrated in FIG. 6, at time t21, the torque-down control torque based on a torque-down request and the deceleration regenerative torque based on a deceleration regeneration request do not match. After time t21, control is performed such that the arbitrated torque changes according to the deceleration regenerative torque. That is, immediately after torque-down control has been started, the electronic control unit 20 performs slow change control such that the actual torque of the motor 30 changes according to the deceleration regenerative torque. The electronic control unit 20 delays the arbitrated ignition timing by performing ignition delay control.

Then, the arbitrated torque reaches the torque-down control torque (time t22). At time t22, the electronic control unit 20 ends the slow change control of the deceleration regenerative torque. In this case, the slow change control of the regenerative torque is performed in a state in which the actual torque of the motor 30 matches the torque-down control torque.

Thereafter, the arbitrated torque reaches the ideal MG torque (time t23). At time t23, the electronic control unit 20 ends the slow change control of the regenerative torque. In this case, the regeneration control is continuously performed in a state in which the actual torque of the motor 30 matches the ideal MG torque. That is, after time t23, the torque corresponding to the torque-down request can be satisfied by only the regeneration using the motor 30. Accordingly, at time t23, the electronic control unit 20 ends the ignition delay control. The arbitrated ignition timing changes in the same way as in the second comparative example from time t21 to time t22, and the arbitrated ignition timing changes slowly to be the ignition timing based on the accelerator-operation-amount request from time t22 to time t23. At this time, the arbitrated ignition timing changes to an advance side in a state in which a rate of change thereof has increased.

Then, the required torque for torque-down reaches the accelerator-operation-amount request (time t24). At time t24, the electronic control unit 20 ends the torque-down control.

In this way, in the second example, regeneration control for torque-down is performed from time t22 to time t24 and ignition delay control is performed from time t21 to time t23. On the other hand, in the second comparative example, regeneration control for torque-down is not performed and ignition delay control is performed from time t21 to time t24. According to the second example, it is possible to regenerate energy using the motor 30 through the regeneration control for torque-down and it is possible to curb a decrease in fuel efficiency due to a delay of ignition because the period in which the ignition delay control is performed is shorter than that in the second comparative example.

Figure 8:
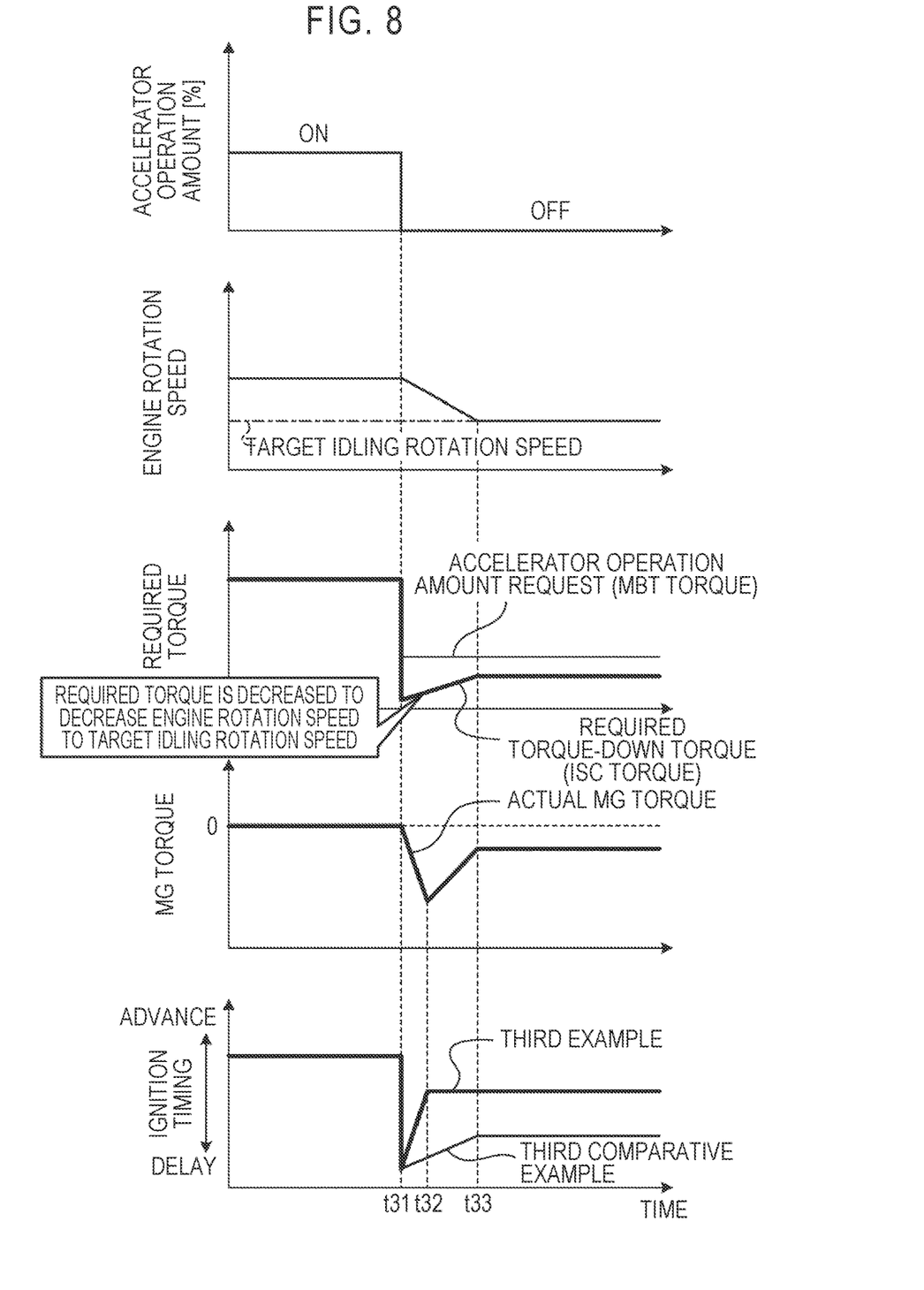
FIG. 8 is a timing chart illustrating a change of a vehicle state when torque-down control is performed according to a third example.
Figure 9:
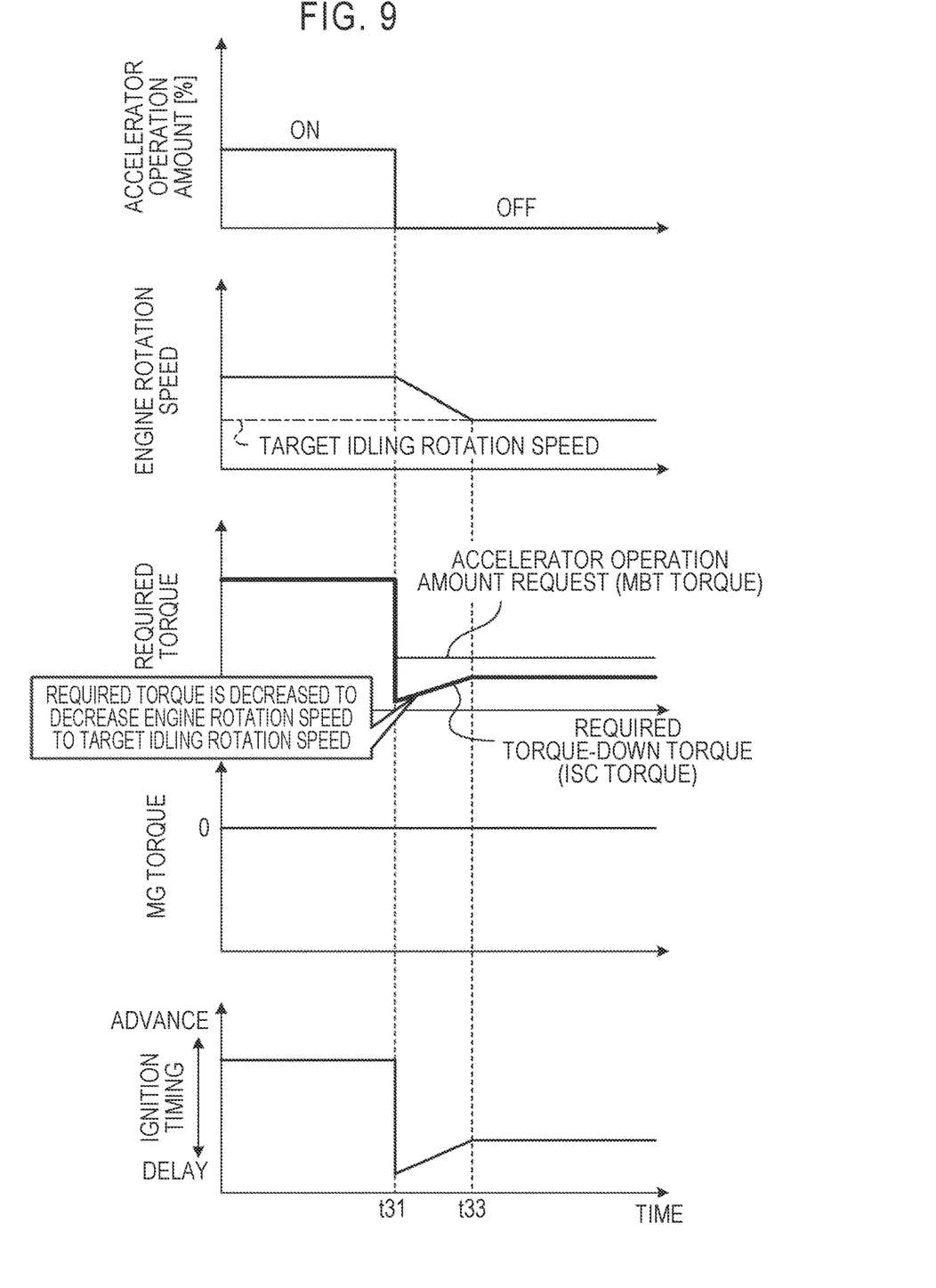
FIG. 9 is a timing chart illustrating a change of a vehicle state when torque-down control is performed according to a third comparative example.

A third example will be described below. FIG. 8 is a timing chart illustrating a change of the vehicle state when torque-down control is performed according to the third example. FIG. 9 is a timing chart illustrating a change of the vehicle state when torque-down control is performed according to a third comparative example.

The third example is an example in which regeneration control using the motor 30 is performed in torque-down control when the vehicle 1 transitions to an idling state. The third comparative example is an example in which regeneration control is not performed at the time of transitioning to the idling state and torque-down is performed using only the ignition delay control. In the third comparative example, as illustrated in FIG. 9, when the accelerator is switched from the ON state to the OFF state, torque-down control for decreasing the engine rotation speed to an idling target rotation speed is started (time t31). In this case, the required torque is controlled such that it reaches a required torque for torque-down (an ISC torque) less than the accelerator-operation-amount request (an MBT torque). The MBT torque is a torque when the ignition timing is the MBT. The ISC torque is a torque which is output to maintain the idling rotation speed. In this way, in the third comparative example, the required torque is decreased to decrease the engine rotation speed to the idling target rotation speed and ignition delay control for delaying the ignition timing is performed at that time, but regeneration using the motor is not performed. On the other hand, since regeneration control is performed at the time of transitioning to the idling state in the third example, a torque corresponding to torque-down can be regenerated using the motor 30 as illustrated in FIG. 8.

As illustrated in FIG. 8, when depression of the accelerator pedal is released from a state in which the accelerator pedal is depressed, the electronic control unit 20 determines that there is a torque-down request and starts torque-down control for transitioning to the idling state (time t31). Immediately after time t31, regeneration control using the motor 30 is started and a regenerative torque changes slowly through slow change control. In the slow change control, the electronic control unit 20 performs ignition delay control for delaying the ignition timing to perform torque-down corresponding to the deficiency.

Then, when the actual MG torque reaches the ideal MG torque, the slow change control of the MG torque and the ignition delay control end (time t32). In the period from time t31 to time t32, the ignition timing changes slowly such that it becomes an ignition timing based on the required torque for torque-down on an advance side in comparison with the third comparative example.

Thereafter, the engine rotation speed reaches the idling target rotation speed (time t33). At time t33, the electronic control unit 20 ends the torque-down control.

In this way, in the third example, regeneration control is performed from time t31 to time t33 and ignition delay control is performed from time t31 to time t32. On the other hand, in the third comparative example, regeneration control is not performed and ignition delay control is performed from time t31 to time t33. According to the third example, it is possible to regenerate energy using the motor 30 through the regeneration control for torque-down and it is possible to curb a decrease in fuel efficiency due to a delay of ignition because the period in which the ignition delay control is performed is shorter than that in the third comparative example.

As described above, according to the embodiment, since the ignition timing is controlled based on the actual torque of the motor 30 at the time of torque-down, the response delay of the motor 30 is considered. Accordingly, it is possible to enhance fuel efficiency while curbing generation of a shock at the time of torque-down.

When torque-down is performed, it is possible to increase an amount of energy regenerated using the motor 30 without injection of additional fuel into the engine 2. Accordingly, it is possible to achieve improvement in drivability and enhancement in fuel efficiency together. Even with high-responsiveness torque-down control, it is possible to realize torque-down as required.

In a modified example of the embodiment, the slow-change guard value is not limited to a value varying according to the vehicle speed. For example, the slow-change guard value may be set to a value varying according to an engagement state of the lockup clutch LC and is set such that the rate of change in regenerative torque per unit time is greater when the lockup clutch LC is not in the directly connected state. When the lockup clutch LC is not in the directly connected state (the disengaged state or the semi-engaged state), transmission of a torque using a hydraulic oil is performed in the torque converter 11.

The installation position of the motor 30 is not particularly limited as long as it is an installation position at which it is connected to the crank shaft 2a of the engine 2 in a power-transmittable manner. The installation position of the motor 30 or a connection position to the engine 2 is not particularly limited as long as it serves as an alternator. The structure of the automatic transmission 12 is not limited to the aforementioned structure.

What is claimed is:

1. A control device for a vehicle including an internal combustion engine and an electric rotary machine connected to the internal combustion engine in a power-transmittable manner, the control device being able to perform torque-down through ignition delay control for delaying an ignition timing of the internal combustion engine and regeneration control for performing regeneration using the electric rotary machine when there is a torque-down request based on a vehicle state,
   wherein the control device is configured to perform torque-down corresponding to a deficiency by delaying the ignition timing of the internal combustion engine when an actual torque of the electric rotary machine through the regeneration control is deficient for the torque-down request,
   wherein a guard value for slowly changing a regenerative torque output from the electric rotary machine through the regeneration control is set in the regenerative torque, and
   wherein the guard value is a value varying according to a vehicle speed and is set such that a rate of change in regenerative torque per unit time increases as the vehicle speed increases.

2. The control device for a vehicle according to claim 1, wherein the vehicle further includes an engagement unit that is provided in a power transmission path between the electric rotary machine and driving wheels, and
   wherein the guard value is a value varying according to an engagement state of the engagement unit and is set such that the rate of change in regenerative torque per unit time increases when the engagement unit is not in an engaged state.

3. The control device for a vehicle according to claim 2, wherein the vehicle further includes a torque converter that is provided between the internal combustion engine and an automatic transmission,
   wherein the engagement unit is a lockup clutch that is provided in the torque converter, and
   wherein the guard value is set such that the rate of change in regenerative torque per unit time increases when the lockup clutch is not in a directly connected state.

* * * * *